UNITED STATES PATENT OFFICE 2,417,441

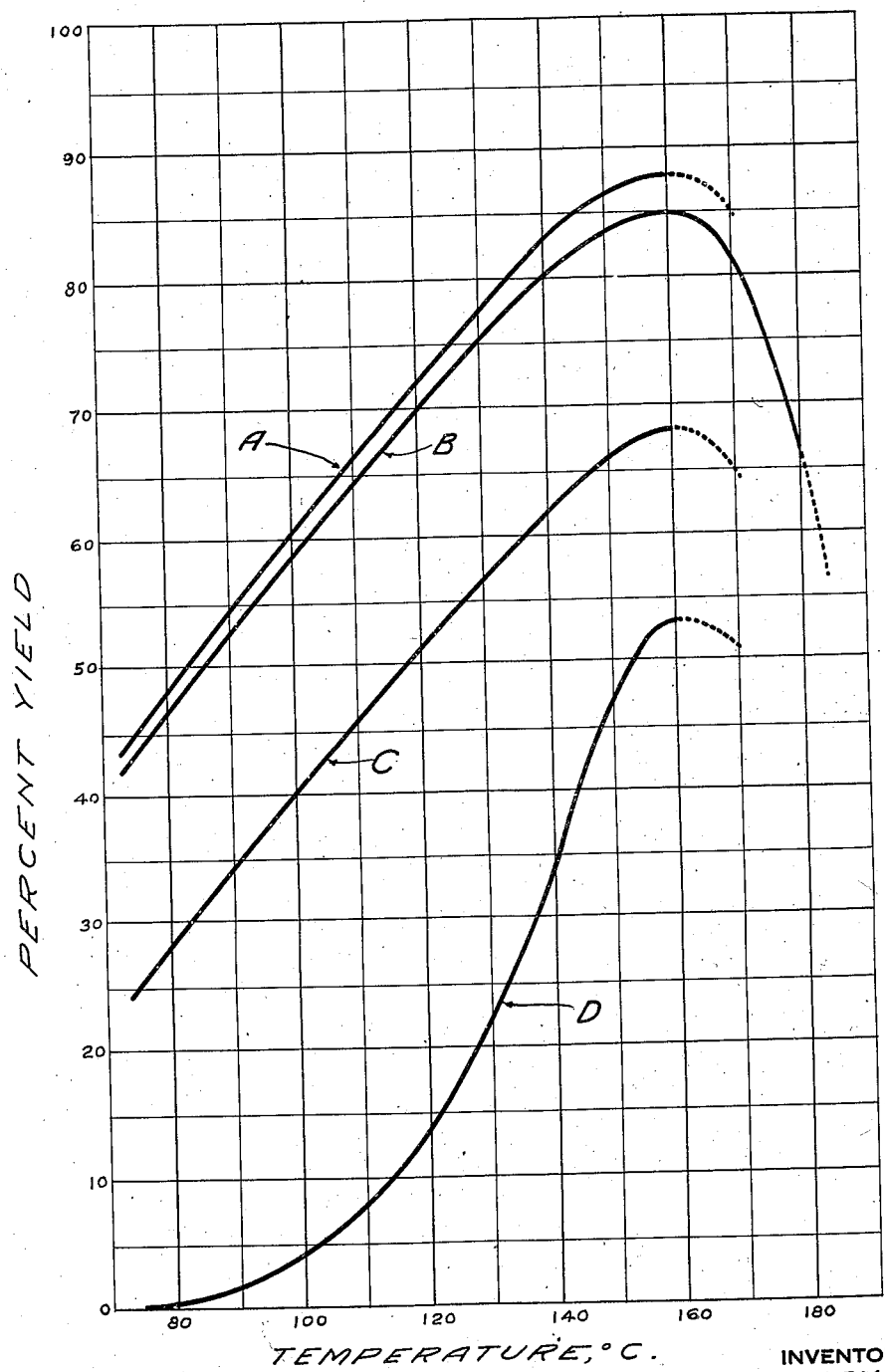

PRODUCTION OF GUANIDINE SALTS

Joseph H. Paden, Glenbrook, and Leslie C. Lane, Jr., Stamford, Conn., assignors to American Cyanamid Company, New York, N. Y., a corporation of Maine Application July 3, 1943, Serial No. 493,431

7 Claims. (Cl. 260—564)

This invention relates to a new method of preparing guanidine salts. Various guanidine salts have been prepared heretofore by heating a neutralized solution of cyanamide with a suitable ammonium salt. The process gave a poor yield of guanidine salt and the product was contaminated with a fairly large percentage of impurities such as dicyandiamide, urea, biguanide salts, ammonium carbonate, ammelide, ammeline and other by-products generally designated as insolubles. When these guanidine salts were used as fertilizers, the presence of small amounts of impurities could be safely ignored. For some important industrial applications of guanidine salts, however, it is important that the salts be obtained in a high state of purity and, of course, in good yields.

Since it was known that the polymerization of cyanamide to dicyandiamide is catalyzed by alkalies, an effort was made to conduct the reaction in the absence of free ammonia and other alkaline materials. This procedure made it possible to prevent the formation of large quantities of dicyandiamide in the reaction mixture but caused the formation of other impurities such as urea, ammelide, ammeline, etc. In addition to this it was found that at temperatures of the order of 100° C., the reaction would not produce guanidine salts in any appreciable yield.

Other processes of preparing guanidine salts were based upon entirely different theories of reaction and, accordingly, used different reaction conditions and proportions of reactants. One such process, for example, employed an excess of ammonia in the belief that the cyanamide was first necessarily converted to dicyandiamide and then to a guanidine salt. Accordingly, enough ammonia was used to catalyze the polymerization of cyanamide to dicyandiamide. Unfortunately, however, dicyandiamide is converted to guanidine salts incompletely and with difficulty. This process was, accordingly, subject to the disadvantage that it gave relatively poor yields of impure guanidine salts even after heating for an extended period of time.

As a result of our studies of the chemical reactions which take place in the formation of guanidine salts from cyanamide and ammonium salts, we have discovered that there are a number of separate and distinct reactions involved in this process, the importance of which has not heretofore been appreciated or taken advantage of. For example, we have found that the formation of guanidine salts by the reaction of cyanamide with ammonium salts is catalyzed by free ammonia.

(1) Cyanamide+ammonium salt $\xrightarrow{NH_3}$ guanidine salt

We can take advantage of this fact by bringing about the reaction of cyanamide with ammonium salts at temperatures within the range 75–100° C. by providing an excess of free ammonia and ammonium salt in the system. Since the prior art processes were based upon an incomplete knowledge of the course of the reactions involved in the formation of guanidine salts from cyanamide and ammonium salts it is not surprising that they failed to achieve maximum yields.

In a system involving cyanamide, ammonium salt, ammonia and water, we believe that the following additional reactions take place more or less simultaneously at varying rates. Some of these reactions have not, to our knowledge, been recognized before.

(2) 2 cyanamide $\xrightarrow{NH_3}$ dicyandiamide
(3) Dicyandiamide+ammonium salt $\longrightarrow$ biguanide salt
(4) Dicyandiamide+ammonia $\longrightarrow$ biguanide
(5) Biguanide salt+ammonium salt $\longrightarrow$ 2 guanidine salt
(6) Biguanide salt+ammonia $\longrightarrow$ guanidine salt+guanidine
(7) Guanidine+ammonium salt $\longrightarrow$ guanidine salt+ammonia
(8) Biguanide+ammonia $\longrightarrow$ 2 guanidine
(9) Biguanide+ammonium salt $\longrightarrow$ biguanide salt+ammonia In addition to the above, there occur as side reactions:

(10) Hydrolysis of cyanamide to urea
(11) Formation of ammonium carbonate
(12) Formation of ammelide, ammeline, etc.

The rate at which these various reactions occur depends upon the temperature, pH, and concentration of the various reactants. Considering Equations 2 and 4, it will be seen that an excess of ammonia favors the formation of dicyandiamide and biguanide. On the other hand, an excess of ammonia favors the production of guanidine and guanidine salt by the reactions of Equations 1, 6 and 8.

A large proportion of ammonium salt in the system would seem to favor the direct production of guanidine salt as shown in Equation 1. However, an excess of ammonium salt apparently would result in the formation of biguanide salt, Equations 3 and 9. The conflicting influences of both ammonia and ammonium salt each of which both speed up and delay the formation of the desired end product, guanidine salt, makes this system one in which predictions cannot be made with certainty.

We have found upon further study of the system that Equations 6 and 8 result in the formation of guanidine. Guanidine is an extremely strong base and will react readily with ammonium salt to deprive it of its acid radical. Accordingly, as there is an ammonium salt available for reaction in the system, the guanidine formed in Equations 6 and 8 will react at once and thus cause the equilibrium of these two equations to shift so that biguanide and biguanide salt will readily react with ammonia as indicated and be withdrawn from the system. Withdrawal of the biguanide salt from the system in this way makes it possible for the dicyandiamide which was formed in the earlier stages of the reaction to be almost completely eliminated through the course of the reactions shown.

From the foregoing, we have concluded that formation of guanidine salts from cyanamide can be improved by having an excess of both ammonia and an ammonium salt in the system. We have made numerous experiments applying these principles and have found that in fact it is possible to obtain much better yields of guanidine salt, having a higher degree of purity than heretofore thought possible by the use of a comparatively large molecular excess of ammonium salt concurrently with the presence of free ammonia in the reaction with cyanamide.

To illustrate our invention in greater particularity, the following examples are given.

Example 1

976 g. (12.2 moles) of ammonium nitrate and 729 g. of 28% ammonium hydroxide were placed in an autoclave and 256 g. (6.1 moles) of cyanamide in the form of a 20–25% aqueous solution added thereto. The autoclave was then assembled and heated to a temperature of 160° C. and held at this temperature for one hour. The autoclave was then cooled, opened and the contents removed and filtered. The solid and filtrate were analyzed and found to contain 635 g. of guanidine nitrate representing a yield of 85% theoretical based on the cyanamide present in the reaction mixture.

Example 2

Example 1 was repeated using the same quantities of reactants at a temperature of 100° C. Guanidine nitrate was formed by this process with a 59.4% yield based on the cyanamide used.

In these two examples, approximately two moles of ammonium nitrate was used for each mole of cyanamide present in the reaction mixture. A number of other runs were made using these same molecular proportions of ammonium nitrate and cyanamide but at different temperatures. Each run was made for one hour. An excess of ammonium hydroxide was, of course, maintained in the reaction mixture. The results of this series of experiments were plotted to obtain curve B of Figure 1. As will be seen maximum yields of guanidine nitrate are obtained over a temperature range of about 140–170° C. At temperatures higher than 170° C., the yield of guanadine nitrate commences to fall off indicating the formation of increased amounts of decomposition products at the higher temperatures.

A significant fact is also noted in that it is possible by our process to obtain very good yields of guanidine salt at temperatures between 75–100° C. This makes it possible to carry out the reaction at atmospheric pressure. Since aqueous solutions of guanidine nitrate may have a boiling point of 130° C. and higher, we can extend the range of our process at atmospheric pressure at temperatures as high as 130° C., or thereabouts, by merely providing means for keeping an excess of free ammonia in the reaction mixture during the reaction. When highly volatile ammonium salts are used, however, it may not be possible in all cases to operate at atmospheric pressure at temperatures as high as 130° C.

In addition to guanidine nitrate, just illustrated, many other guanidine salts may be advantageously prepared in exceptionally good yields by our process. Since guanidine is an extraordinarily strong base, it forms comparatively stable salts with many acids. Guanidine salts such as guanidine carbonate, guanidine sulfate, guanidine hydrochloride, guanidine phosphate, guanidine sulfamate, guanidine acetate, guanidine phenolate, guanidine ammelide, guanidine benzoate, guanidine succinate, guanidine propionate, guanidine salicylate and many other guanidine salts can be prepared by our process.

To compare our process with a process in which an excess of free ammonia but only an equivalent of ammonium salt is used for each equivalent of cyanamide present in the reaction mixture, a series of experiments was made of which the following is illustrative.

Example 3

640 g. (8 moles) of ammonium nitrate and 525 g. of 28% ammonium hydroxide, sufficient to give a 63% solution of ammonium nitrate, were placed in an autoclave. To this mixture, at room temperature, was added 336 g. (8 moles) of cyanamide as a 24% aqueous solution. The autoclave was then closed and heated to 160° C. for one hour after which it was cooled, opened and the contents removed and filtered to separate the guanidine nitrate product. Analysis of the dry solid and the liquid showed that guanidine nitrate was formed with a 67% yield. The dry product analyzed 90.8% guanidine nitrate.

Other runs at different temperatures were made and the results plotted on the curve of Figure 1 to give curve C. As will be seen the yield of guanidine nitrate was considerably lower at all temperatures. This is undoubtedly due to the fact that the reaction mixture did not contain enough ammonium nitrate to bring about a shift in the equilibrium of Equation 1, above, in the direction favoring the production of guanidine salt.

Another series of experiments was made using a process in which free ammonia is avoided. In these experiments, two moles of ammonium nitrate was used for each mole of cyanamide present in the reaction mixture. One such experiment was as follows:

Example 4

975 g. (12.2 moles) of ammonium nitrate was dissolved in 525 g. of water to give a 65% solution of ammonium nitrate. This solution and 256 g. (6.1 moles) of cyanamide in the form of a 25.3% aqueous solution were placed in an autoclave and heated with agitation for one hour at 160° C. After cooling and filtering the contents of the autoclave, an analysis of the solid and of the filtrate showed the presence of 400 g., or a 53.8% yield, of guanidine nitrate. The dry solid analyzed 76.3% guanidine nitrate.

Similar experiments were run at different temperatures and curve D of Figure 1 was plotted from the data obtained. Again, maximum yields were obtained at 160° C. However, at lower temperatures the yield of guanidine nitrate dropped rapidly and at 75° C. no guanidine nitrate whatever was obtained. At 100° C., the yield of guanidine nitrate was negligible. Of course, the guanidine nitrate prepared by this procedure and by the procedure of Example 3 was contaminated by large quantities of dicyandiamide, urea, and other impurities.

Another series of experiments was run using an excess of free ammonia in the reaction mixture and a molecular ratio of ammonium nitrate to cyanamide of approximately 3 to 1. Two of these test runs were as follows:

*Example 5*

640 g. (8 moles) of ammonium nitrate, 535 g. of 28% ammonium hydroxide and 459 g. (2.67 moles) of cyanamide in the form of a 24.4% aqueous solution were placed in an autoclave and heated with agitation for one hour at 160° C. The autoclave was then cooled and the contents removed and the filtrate and solid analyzed. Analysis of the dried solid and the filtrate showed the presence of 285 g. of guanidine nitrate representing an 88% yield of guanidine nitrate based on the cyanamide employed in the reaction. The guanidine nitrate analyzed 94.1% pure and contained no detectable amounts of dicyandiamide or urea. It had not more than 0.2% of insolubles. Most of the material other than guanidine nitrate was ammonium nitrate which was easily removed by washing with water.

*Example 6*

Example 5 was repeated using the same quantities of reactants, the temperature however being 125° C. Guanidine nitrate was recovered from the reaction mixture with a 74% yield based on the amount of cyanamide used.

Curve A of Figure 1 represents the course of the reaction using larger proportions of ammonium salt to cyanamide as illustrated by the last two examples. The yields may be increased further by using even higher proportions of ammonium salt to cyanamide and by heating the reaction mixture for more extended periods of time.

As will be apparent from the foregoing, the temperature range over which we may carry out our new process varies from about 75° C. to about 180° C. At temperatures below 75° C., the reaction rate is too slow to be of commercial interest. At temperatures in excess of 180° C., much decomposition occurs and the guanidine salt is recovered in low yields and contaminated with undesirable impurities.

*Example 7*

An ammoniacal solution containing 1 mole of ammonium acetate at a concentration of 65% was heated at refluxing temperature at atmospheric pressure with one-half molecular equivalent of cyanamide. The reaction mixture was then cooled. Chemical analysis of the solution proved the formation of guanidine acetate therein.

*Example 8*

An ammoniacal solution of 1 mole of diammonium phosphate having a concentration of 65% thereof was heated at atmospheric pressure with one-half of a molecular equivalent of aqueous cyanamide. After heating the reaction mixture at its boiling point for some time, it was cooled and analyzed. Guanidine phosphate was found as a reaction product.

The cyanamide used by us may be in the form of the solid crystalline cyanamide, $H_2NCN$, or, preferably, in the form of an aqueous solution thereof. Aqueous solutions containing 20–80% of cyanamide are readily obtained and may be used by us. Solutions containing less than 20% of cyanamide may also be used but their use makes it necessary to evaporate more water to recover the final reaction product.

The amount of ammonia in the reaction mixture may also vary considerably. However, we have found that there should be at least enough free ammonia present to give the reaction mixture, at room temperature, a pH of at least 8. Preferably, the reaction is carried out with sufficient ammonia present to give the solution a pH of between 9 and 11, at room temperature. When operating at atmospheric pressure it may be found advisable to add ammonia to the reaction mixture continuously or from time to time as the reaction proceeds. Since ammonia which is involved in the various reactions illustrated above is eventually regenerated it is not necessary that the amount of ammonia used be dependent on the molecular amounts of cyanamide or ammonium salt involved in the reaction. Ordinarily, the amount of ammonia used is governed by the pH of the reaction mixture.

The amount of ammonium salt may also vary widely from about 2 equivalents of ammonium salt for each mole of cyanamide involved in the reaction. More ammonium salt is preferable since the reaction takes place faster and with higher yields of guanidine salt when using higher proportions of ammonium salt. The ammonium salt is ordinarily added to the reaction vessel in the form of an aqueous solution containing 20–70%, or more, of the salt. Solutions containing less than 20% of ammonium salt may also be used but since the reaction is faster at higher concentrations, and as the product must eventually be recovered from the water of solution, we prefer to use a minimum amount of water in the reaction mixture.

After the reaction mixture has been heated from 10 minutes to about 3 hours, the guanidine salt formed therein may be recovered, in most cases, by simply cooling the solution which results in the deposition of crystals of the desired guanidine salt. In the case of the more highly soluble guanidine salts, such as guanidine carbonate, it may be necessary to evaporate the water from the product until the guanidine salt can be recovered. The product may then be washed with a small amount of water to remove mother liquor.

We claim:

1. A method of preparing guanidine salts which comprises the step of heating at temperatures within the range of 75° C. to 180° C. for a period of time from ten minutes to about three hours a solution in water of one mol of cyanamide and at least two equivalents of an ammonium salt in the presence of sufficient free ammonia to give the solution a pH of at least 8 measured at room temperature.

2. A method of preparing guanidine salts which comprises the step of heating at temperatures within the range of 75° C. to 180° C. for a period of time from ten minutes to about three hours a solution in water of one mol of cyanamide and at least two equivalents of an ammonium salt in the presence of sufficient free ammonia to give the solution a pH between 9 and 11, measured at room temperature.

3. A method of preparing guanidine salts which comprises the steps of heating at temperatures within the range of 140° C. to 170° C. for a period of time from ten minutes to about three hours a solution in water of one mol of cyanamide and at least two equivalents of an ammonium salt in the presence of sufficient free ammonia to give the solution a pH between 9 and 11, measured at room temperature, and thereafter cooling the heated solution and separating the resulting guanidine salt therefrom.

4. A method of preparing guanidine salts which comprises the step of heating at atmospheric pressure at a temperature within the range of 75° C. to 130° C. for a period of time from ten minutes to about three hours a solution in water of one mol of cyanamide and at least two equivalents of an ammonium salt while adding free ammonia to the solution to maintain a pH of between 9 and 11 measured at room temperature.

5. A method of preparing guanidine nitrate which comprises the step of heating at temperatures within the range of 75° C. to 180° C. for a period of time from ten minutes to about three hours a solution in water of one mol of cyanamide and at least two equivalents of ammonium nitrate in the presence of sufficient free ammonia to give the solution a pH of between 9 and 11 when measured at room temperature.

6. A method of preparing guanidine acetate which comprises the step of heating at temperatures within the range of 75° C. to 180° C. for a period of time from ten minutes to about three hours a solution in water of one mol of cyanamide and at least two equivalents of ammonium acetate in the presence of sufficient free ammonia to give the solution a pH of between 9 and 11 when measured at room temperature.

7. A method of preparing guanidine carbonate which comprises the step of heating at temperatures within the range of 75° C. to 180° C. for a period of time from ten minutes to about three hours a solution in water of one mol of cyanamide and at least two equivalents of ammonium carbonate in the presence of sufficient free ammonia to give the solution a pH of between 9 and 11 when measured at room temperature.

JOSEPH H. PADEN.
LESLIE C. LANE, Jr.

REFERENCES CITED

The following references are of record in the file of this patent:

UNITED STATES PATENTS

| Number | Name | Date |
|---|---|---|
| 2,252,400 | Hill et al. | Aug. 12, 1941 |
| 2,221,478 | Hill et al. | Nov. 12, 1940 |
| 2,114,280 | Aldred | Apr. 19, 1938 |
| 2,230,827 | Burns | Feb. 4, 1941 |